(12) United States Patent
Biedenstein et al.

(10) Patent No.: US 7,593,957 B2
(45) Date of Patent: Sep. 22, 2009

(54) HYBRID DATA PROVIDER

(75) Inventors: Stefan Biedenstein, Bad Schoenborn (DE); Erich R. Marschall, Nussloch (DE); Hartmut Koerner, Rauenberg (DE); Peter K. Zimmerer, Walldorf (DE); Stefan Dipper, Wiesloch (DE)

(73) Assignee: SAP AG, Walldorf (DE)

( * ) Notice: Subject to any disclaimer, the term of this patent is extended or adjusted under 35 U.S.C. 154(b) by 295 days.

(21) Appl. No.: 11/513,815

(22) Filed: Aug. 30, 2006

(65) Prior Publication Data

US 2008/0059524 A1   Mar. 6, 2008

(51) Int. Cl.
*G06F 17/00* (2006.01)

(52) U.S. Cl. .......................... 707/102; 707/1; 707/100; 707/200

(58) Field of Classification Search .................. 707/1, 707/100, 102, 200
See application file for complete search history.

(56) References Cited

OTHER PUBLICATIONS

SAP NetWeaver, A Complete Platform for Large_Scale Business Intelligence, May 2005, Winter Corporation, pp. 1-27.*
Gergely Lukacs, Towards an Interactive Query Environment for a Multi-Attribute Decision Model with Imprecise Data and Vague Query Conditions, 200, IEEE, pp. 708-712.*
SAP_BIWA, SAP Business Information Warehouse Architecture Chapter 3, Jul. 2002, pp. 35-88.*
Gergely Lukacs, Towards an Interactive Query Environment for a Multi-Attribute Decision Model with Imprecise Data and Vague Query Conditions, 2000, IEEE, pp. 708 - 712.*

\* cited by examiner

*Primary Examiner*—Fred I Ehichioya
(74) *Attorney, Agent, or Firm*—Mintz, Levin, Cohn, Ferris, Glovsky & Popeo, P.C.

(57) ABSTRACT

Systems and techniques for the hybrid provision of data are described. In one aspect, a system includes a first collection of information stored in accordance with a reporting data model, a second collection of information setting forth a collection of one or more additive delta records, and an analytic engine to perform queries on the first collection of information and the second collection of information to yield an aggregated result set that is based on the contents of both the first collection of information and the second collection of information. The additive delta records each include a numeric value that characterizes the magnitude of a change to a numeric measure in the first collection and identification information that identifies the numeric measure in the first collection. The identified numeric measure is no longer current.

18 Claims, 7 Drawing Sheets

| | Document No. | Document Item | ... | Order Quantity | Unit of measure | ... |
|---|---|---|---|---|---|---|
| 835 | 100001 | 10 | ... | 200 | Pieces | ... |
| 840 | 100001 | 20 | ... | 150 | Pieces | ... |
| 845 | 100002 | 10 | ... | 250 | Kg | ... |
| 850 | ... | ... | ... | ... | ... | ... |
| | 805 | 810 | 815 | 820 | 825 | 830 |

| | Document No. | Document Item | ... | Order Quantity | Unit of measure | ... |
|---|---|---|---|---|---|---|
| 935 | 100001 | 10 | ... | 180 | Pieces | ... |
| 940 | 100001 | 20 | ... | 165 | Pieces | ... |
| 945 | ... | ... | ... | ... | ... | ... |
| | 905 | 910 | 915 | 920 | 925 | 930 |

| | Document No. | Document Item | ... | Order Quantity | Unit of measure | ... |
|---|---|---|---|---|---|---|
| 1035 | 100001 | 10 | ... | -20 | Pieces | ... |
| 1040 | 100001 | 20 | ... | 15 | Pieces | ... |
| 1045 | ... | ... | ... | ... | ... | ... |
| | 1005 | 1010 | 1015 | 1020 | 1025 | 1030 |

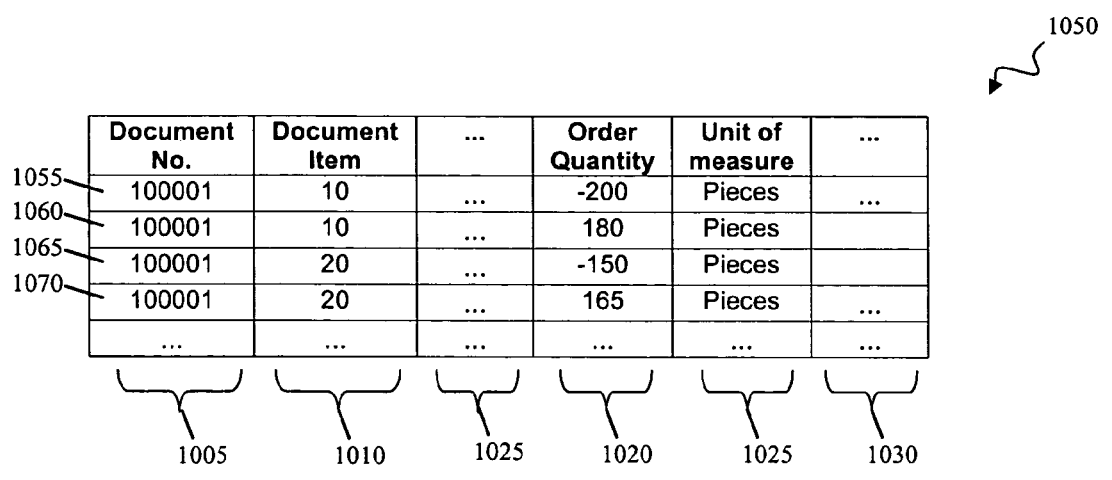

| Document No. | Document Item | ... | Order Quantity | Unit of measure | ... |
|---|---|---|---|---|---|
| 100001 | 10 | ... | -200 | Pieces | ... |
| 100001 | 10 | ... | 180 | Pieces | ... |
| 100001 | 20 | ... | -150 | Pieces | ... |
| 100001 | 20 | ... | 165 | Pieces | ... |
| ... | ... | ... | ... | ... | ... |

FIG. 10B

HYBRID DATA PROVIDER

BACKGROUND

This disclosure relates to a hybrid provider of data.

The storage of information by a machine can be tailored for operational efficiency and effectiveness in different contexts. Such tailoring is often achieved by using different data models in the different contexts. A data model is the logical and physical structure of a data store, and can include the physical storage parameters needed to implement a design.

Contexts for which data models can be tailored include data analysis, data modification, and/or size minimization. For example, transactional data models are generally tailored to facilitate modification of the stored data. In this regard, transactional data models generally ensure that modifications can be made quickly by using relatively small data storage structures that can be modified independently of other transactional data structures. A relatively small data storage structure is one that is comparable in size to the largest common change transaction. A change transaction is a transaction in which the stored data content is added, deleted, or otherwise changed. A transactional data model can thus include individual data objects that are comparable in size to common changes to content. For example, a transactional data model can include data objects that correspond to individual sales orders in a business, individual customers, and/or individual products.

As another example, reporting data models are generally tailored to facilitate analysis and/or reporting of stored data. In this regard, reporting data models generally ensure that large amounts of stored data can be accessed quickly and easily by using relatively large data storage structures. Also, reporting data models can be structured so that portions of the data model only include numeric data. Any exhaustive or near-exhaustive searching can thus be performed rapidly on this numeric data. A reporting data model can be several hundred or more times the size of common change transactions. For example, a reporting data model can be a relational database such as a common warehouse metamodel (CWM) star schema that includes objects which store data regarding several thousand, million, or billion sales orders, customers, and/or products.

SUMMARY

Systems and techniques for the hybrid provision of data are described. In one aspect, a system includes a first collection of information stored in accordance with a reporting data model, a second collection of information setting forth a collection of one or more additive delta records, and an analytic engine to perform queries on the first collection of information and the second collection of information to yield an aggregated result set that is based on the contents of both the first collection of information and the second collection of information. The additive delta records each include a numeric value that characterizes the magnitude of a change to a numeric measure in the first collection and identification information that identifies the numeric measure in the first collection. The identified numeric measure is no longer current.

This and other aspects can include one or more of the following features. The reporting model can include a set of relational tables, such as a common warehouse metamodel. The system can include a data flow path to upload the second collection of information into the first collection of information. The first collection of information can include previously uploaded additive delta records. All of the additive delta records can be pending and not yet uploaded into the first collection of information.

The system can also include an indexed data store that is accessible to the analytic engine for the generation of aggregated result sets that include information from the indexed data store, as well as a data flow path from the first collection of information to the indexed data store. The system can also include a third collection of information stored in accordance with a transactional data model, and a data flow path to convey transactional changes made to the third collection of information to the second collection of information. The data flow path can include an activation queue to receive the transactional changes made to the third collection of information and convey information describing the transactional changes to the second collection of information. The data flow path can also include an active record store that stores complete information received from the third collection of information.

In another aspect, an article includes one or more tangibly-embodied machine-readable media storing instructions. The instructions are operable to cause one or more machines to perform operations. The operations include querying a first collection of information stored in accordance with a reporting data model, querying a second collection of information setting forth a collection of one or more additive delta records, and generating an aggregated result set that reflects both the contents of the first collection of information and the second collection of information. The additive delta records each include a numeric value that can be added to a measure in the first collection of information and identification information that identifies the measure in the first collection of information.

This and other aspects can include one or more of the following features. The first collection of information can include a set of relational tables. The second collection of information can include a data table that associates the numeric value and the identification information of each additive delta in a row. The aggregated result set can be provided by summing a first numeric value of a first additive delta with a first measure in the first collection of information, where the identification information of the first additive delta is identical to information associated with the first measure in the first collection of information.

The operations can also include searching an indexed data store. The aggregated result set can reflect contents of the first collection of information, contents of the second collection of information, and contents of the indexed data store. The second collection of information can be uploaded into the first collection of information.

In another aspect, a system includes a collection of data objects that are modified in response to transactional changes, a collection of relational data tables that reflect less than all of the transactional changes to content of the data object collection, a data flow path to convey unreflected changes to the data object collection to the relational data table collection, wherein the data flow path includes a staging data storage area that accumulates pending changes to be made to the relational data table collection, and an analytic engine to perform queries on both the staging data storage area and the collection of relational data tables to generate an aggregated result set that reflects the contents of both the staging data storage area and the collection of relational data tables.

This and other aspects can include one or more of the following features. The pending changes can include additive delta records. The additive delta records can include a numeric value that characterizes the change to a numeric measure in the collection of relational data tables and identification information that identifies the numeric measure in the collection of relational data tables. The identified numeric measure is no longer current. The system can also include an indexed data store that is accessible to the analytic engine for the generation of aggregated result sets that include information from the indexed data store.

The details of one or more implementations are set forth in the accompanying drawings and the description below. Other features and advantages will be apparent from the description and drawings, and from the claims.

DESCRIPTION OF DRAWINGS

FIGS. 8, 9, 10A, 10B illustrate additive deltas and their correspondence to the contents of a reporting or other data model stores.

Like reference symbols in the various drawings indicate like elements.

DETAILED DESCRIPTION

Figure 1:
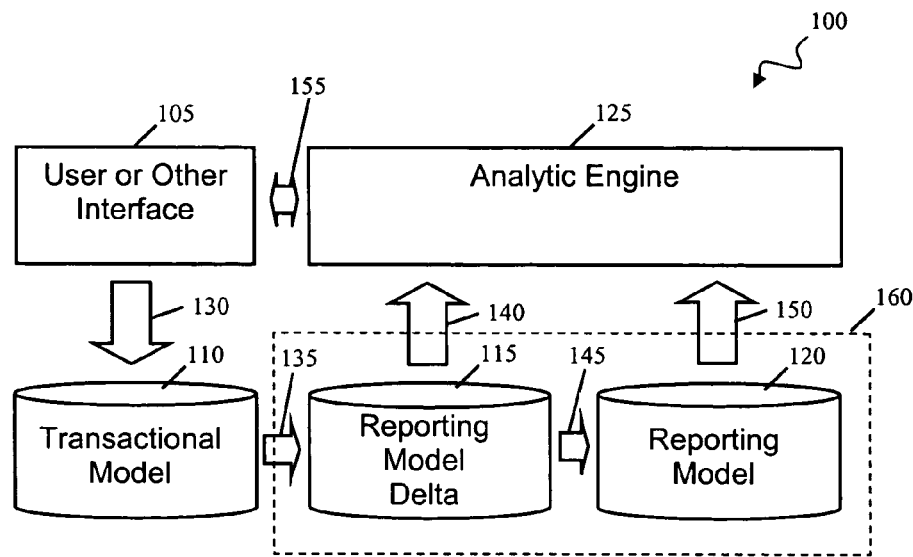
FIG. 1 is a schematic representation of a system that includes a hybrid data provider.

FIG. 1 is a schematic representation of a system 100 that includes a hybrid data provider. System 100 includes a user or other interface 105, a transactional model data store 110, a reporting model delta data store 115, a reporting model data store 120, and a analytic engine 125. Information is conveyed between interface 105, data stores 110, 115, 120, and analytic engine 125 along data flow paths 130, 135, 140, 145, 150, 155. For example, analytic engine access the contents of both reporting model delta data store 115 and reporting model data store 120 over data flow paths 140, 145 when running queries. Such queries can yield an aggregated result set that accurately reflects the contents of both reporting model delta data store 115 and reporting model data store 120. Reporting model delta data store 115 and reporting model data store 120 can thus together act as a hybrid data provider 160.

User or other interface 105 is a collection of one or more input/output devices for interacting with a human user or with another data processing system. For example, interface 105 can be a presentation system or a data communications gateway. Data flow path 130 is input received over interface 105 that causes a change to information stored in one or more transactional data models in transactional model data store 110. Such changes include the creation, deletion, and modification of all or a portion of the contents of one or more transactional model data stores. Output over interface 105 can present the results of data processing activities in system 100. For example, data flow path 155 can convey the results of queries or other operations performed on hybrid data provider 160 for presentation on a monitor or a data communications gateway.

Transactional model data store 110 is a collection of information that is stored at one or more data storage devices. Transactional model data store 110 stores this information in one or more transactional models. Data flow path 135 conveys information describing changes to data stored in a transactional model data store 110 to reporting model delta data store 115. Such changes include the creation, deletion, and modification of all or a portion of the contents of one or more transactional model data stores.

Reporting model delta data store 115 is a collection of information that is stored at one or more data storage devices. The stored information can characterize changes to at least some of the content of one or more transactional model data store 110. For example, reporting model delta data store 115 can receive multiple changes over data flow path 135 and accumulate them by storing them before conveying them to reporting model data store 120. Reporting model delta data store 115 can accumulate the changes in one or more different data models. For example, as discussed further below, reporting model delta data store 115 can accumulate the changes as additive delta records in one or more data tables. Data flow path 145 periodically conveys the accumulated changes to reporting model data store 120. Such conveyances can be periodic in that the conveyances are generally not continuous but rather reflect a number of discrete changes to transactional model data store 110. For example, several tens or even hundreds of such changes can be accumulated at reporting model delta data store 115 before their conveyance.

Reporting model data store 120 is a collection of information that is stored at one or more data storage devices. The stored information can characterize at least some of the information stored in one or more transactional data models in transactional model data store 110. Reporting model data store 120 can store this information in one or more reporting data models.

Data flow path 140 allows analytic engine 125 to access the accumulated changes in reporting model delta data store 115. Data flow path 150 allows analytic engine 125 to access the contents of reporting model data store 120.

Analytic engine 125 is a collection of data processing activities performed in accordance with the logic of a set of machine-readable instructions. The data processing activities can include running queries on the contents of both reporting model delta data store 115 and reporting model data store 120, which act together as hybrid data provider 160. The results of such queries can be aggregated to yield an aggregated result set. A query is a request for information. A result set is a set of information that answers a query. An aggregated result set is a set of information from two or more data stores that answers a query. The set of information in an aggregated result set can be, e.g., a union of the results of independent queries on the two or more data stores. The aggregated result sets can be conveyed to interface 105 over data flow path 155. Interface 105 can, in turn, render the aggregated result sets over an output device for a human or other user. This rendering of aggregated result sets drawn from hybrid data provider 160 (i.e., both reporting model delta data store 115 and reporting model data store 120) allows system 100 to accurately portray, the contents of different data stores having different data models.

Figure 2:
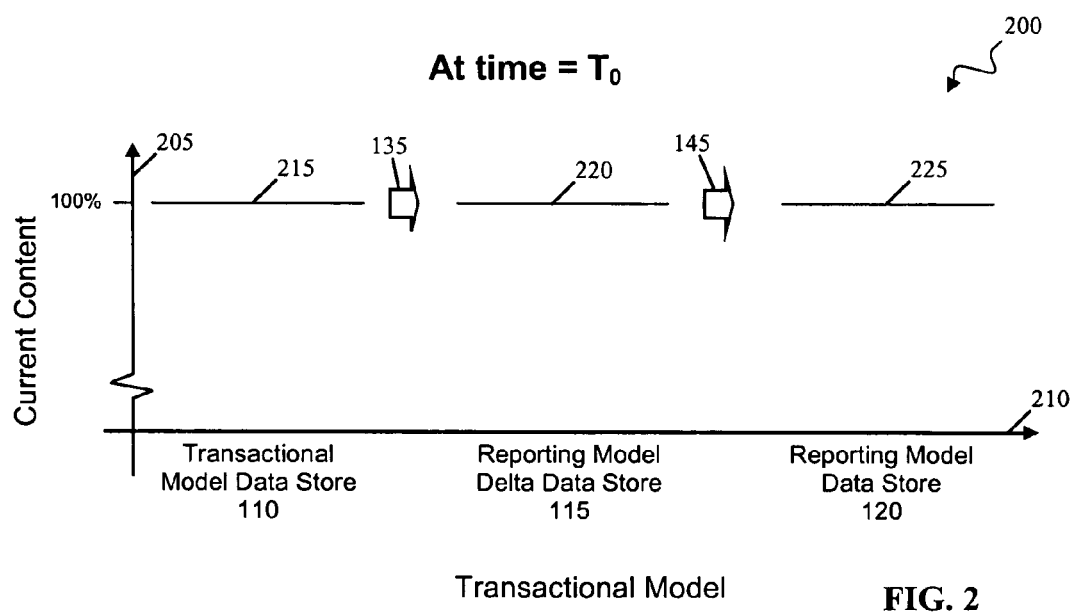
FIG. 2 is a graph that schematically represents how current the data content of data stores in the system of FIG. 1 are at a time $T_0$.

FIG. 2 is a graph 200 that schematically represents how "current" the data content of transactional model data store 110, reporting model delta data store 115, and reporting model data store 120 are at a time $T_0$. Graph 200 includes an vertical axis 205 and a horizontal axis 210. Vertical axis 205 represents what percent of the data content of a data store is current. Horizontal axis 210 represents the position of data stores 110, 115, 120 relative to the data flow paths 135, 145 between them. "Current" data is data that reflects every data transaction on the data in system 100 that is relevant to responding to a query. The vertical position of line 215 denotes what percent of the data in transactional model data store 110 is current. The vertical position of line 220 denotes what percent of the data in reporting model delta data store 115 is current. The vertical position of line 225 denotes what percent of the data in reporting model data store 110 is current.

Time $T_0$ is a time when the data that is relevant to responding to queries is identical in data stores 110, 115, 120. In other words, all of the data in data stores 110, 115, 120 is entirely current, as represented by the identical vertical positions of lines 215, 220, 225 at 100%. For example, time $T_0$ can be a time immediately after the creation and population of data stores 110, 115, 120 with initial values (i.e., at the "initiation" of data stores 110, 115, 120). As another example, time $T_0$ can be a time after an extended period of latency in system 100. Such an extended period of latency can provide data flow paths 135, 145 the opportunity to propagate relevant changes to transactional model data store 110 carried over data flow path 130 onward to data stores 115, 120.

As a practical matter, as the size and complexity of system 100 increases, the likelihood of all data in data stores 110, 115, 120 ever being current decreases. In other words, time $T_0$ will generally not be reached since the changes to transactional model data store 110 carried over data flow path 130 are first accumulated at reporting model delta data store 115 and only periodically committed to reporting model data store 120. This is not surprising in light of reporting model data store 120 being tailored for analysis and reporting, rather than transactions.

Figure 3:
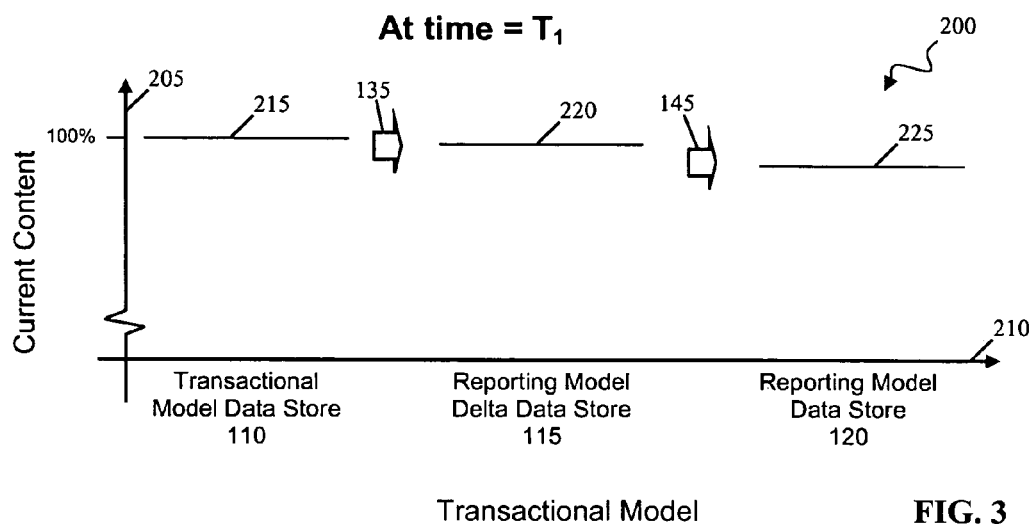
FIG. 3 is a graph that schematically represents how current the data content of data stores in the system of FIG. 1 are at a time $T_1$.

This scenario is reflected in FIG. 3, which is a graph 300 that schematically represents how current the data content of transactional model data store 110, reporting model delta data store 115, and reporting model data store 120 are at a time $T_1$.

As can be seen, the vertical position of line 215 remains unchanged, denoting that all of the data in transactional model data store 110 is current. However, the vertical position of line 220 is lower, denoting that less than all of the data in reporting model delta data store 115 is current. Further, the vertical position of line 225 denotes is yet lower than the vertical position of line 220, denoting that even less of the data in reporting model data store 120 than the data in reporting model delta data store 115 is current. In particular, data flow path 135 does not immediately convey changes from transactional model data store 110 to reporting model delta data store 115, and data flow path 145 does not immediately convey changes from reporting model delta data store 115 to reporting model data store 120. Despite the delays associated with data flow paths 135, 145, the majority of data in reporting model delta data store 115 remains current. For example, in some implementations, over 95%, or even over 99%, of the data in reporting model delta data store 115 remains current.

With analytic engine 125 providing aggregated result sets drawn from both reporting model delta data store 115 and reporting model data store 120, the benefits of quick data access in reporting model data store 120 for the majority of the data can be combined while the benefit of early access to additional current data in reporting model delta data store 115. In particular, even recent transactions will appear in result sets generated by analytic engine 125 with a minor additional cost associated with the access and retrieval of data from reporting model delta data store 115.

Figure 4:
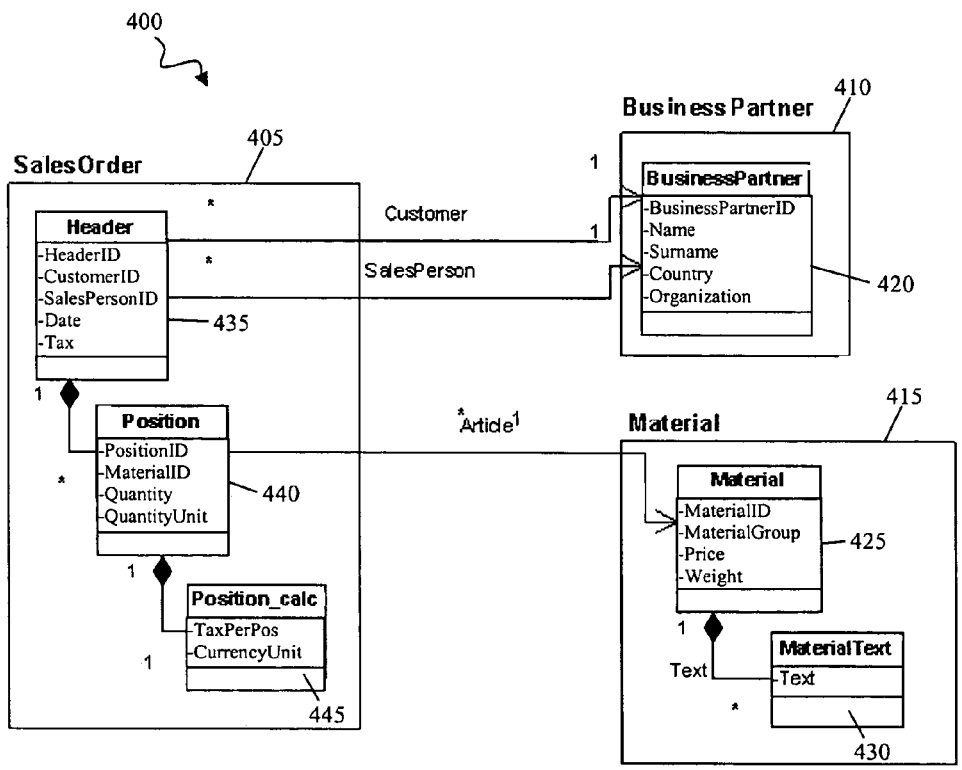
FIG. 4 is a class diagram of an example transactional data model.

FIG. 4 is a class diagram of an example transactional data model that can be used to store data at transactional model data store 110 (FIG. 1), namely a business object model 400. Business object model 400 includes a sales order package 405, a business partner package 410, and a material package 415. Business partner package 410 can include a business partner object class 420. Business partner object class 420 has a business partner identity attribute, a name attribute, a surname attribute, a country attribute, and an organization attribute.

Material package 415 can include a material object class 425 and material text object classes 430. Material object class 425 has a material identity attribute, a material group attribute, a price attribute, and a weight attribute. Material text object class 430 has a text attribute. Each material object class 425 can have a collection of zero or more associated material text object classes 430 in the role of "text."

Sales order package 405 can include a header object class 435, a position object class 440, and a position calculation object class 445. Header object class 435 has a header identity attribute, a customer identity attribute, a salesperson identity attribute, a date attribute, and a tax attribute. Header object class 435 is related to a first associated business partner object class 420 in the role of "customer" and to a second associated business partner object class 420 in the role of "salesperson." Header object class 435 also has a collection of zero or more associated position object classes 440.

Position object class 440 has a position identity attribute, a material identity attribute, a quantity attribute, and a quantity unit. Position object class 440 is related to one or more material object classes 425. Each position object class 440 also has an associated position calculation object class 445. Position calculation object class 445 has a taxperpos attribute and a currency unit attribute. Taxperpos attributes deal with the tax rate at a position.

Data stored in instantiated objects within business object model 400 can characterize the operations of an enterprise. For example, objects within business object model 400 can characterize a collection of sales events. Moreover, such object can be modified easily as individual sales events are added, modified, or deleted.

Figure 5:
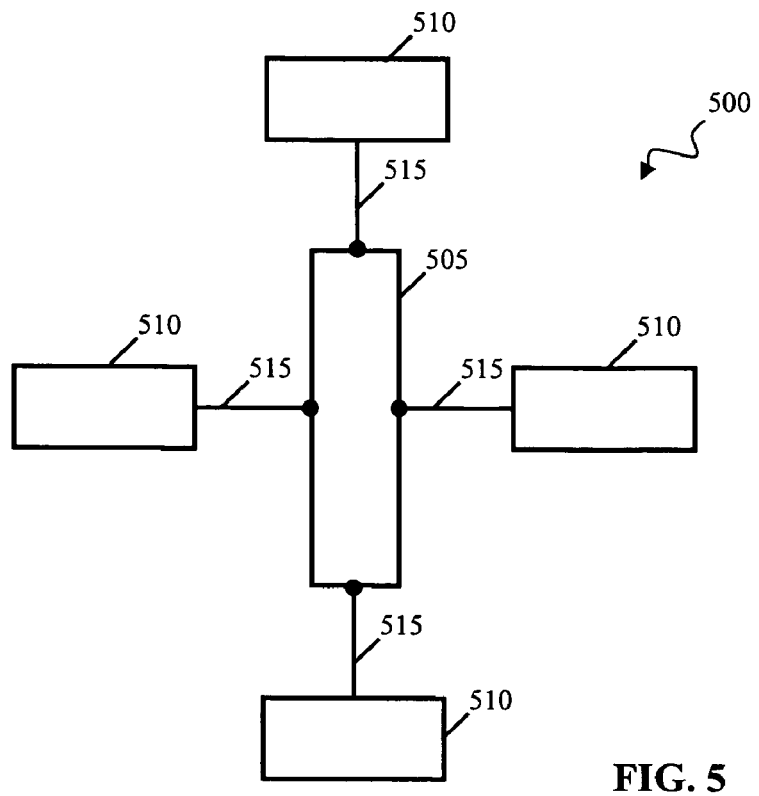
FIGS. 5 and 6 are schematic representations of example reporting data models.

FIG. 5 is a schematic representation of an example reporting data model that can be used to store data at reporting model data store 120 (FIG. 1), namely a star schema 500. Data stored in star schema 500 can also characterize the operations of an enterprise, such as the same collection of sales events characterized by instantiated objects within business object model 400 (FIG. 4). However, since star schema 500 is tailored for data access and reporting, star schema 500 is generally only modified occasionally to reflect a collection of multiple sales events.

Star schema 500 is a set of relational tables. In particular, star schema 500 includes a fact table 505, a collection of dimension tables 510, and a collection of join paths 515. Fact table 505 is a collection of measure objects that include measures (also known as "measurements," "metrics," "keyfigures," and/or "facts") organized into rows and columns. The measures in fact table 505 can set forth information about the collection of sales transactions and are typically numeric. For example, the measures in fact table 505 can include numeric data describing the amount, quantity, customer, sales person, and article sold.

Dimension tables 510 are collections of one or more dimension objects that organize characteristics into rows and columns. These characteristics describe aspects of the measures in fact table 505. For example, a first dimension table 510 can include characteristics describing the material identifications and material groups of measures in fact table 505 that identify the articles sold. As another example, a second dimension table can include characteristics describing the business partner identifications, names, surnames, and countries of measures in fact table 505 that describe the customers or the sales persons involved in the transactions.

Join paths 515 indicate relationships between the measures in fact table 505 and the characteristics in dimension tables 510. For example, join paths 515 can indicate that measures in fact table 505 are primary keys that can be used to identify records in dimension tables 510.

Figure 6:
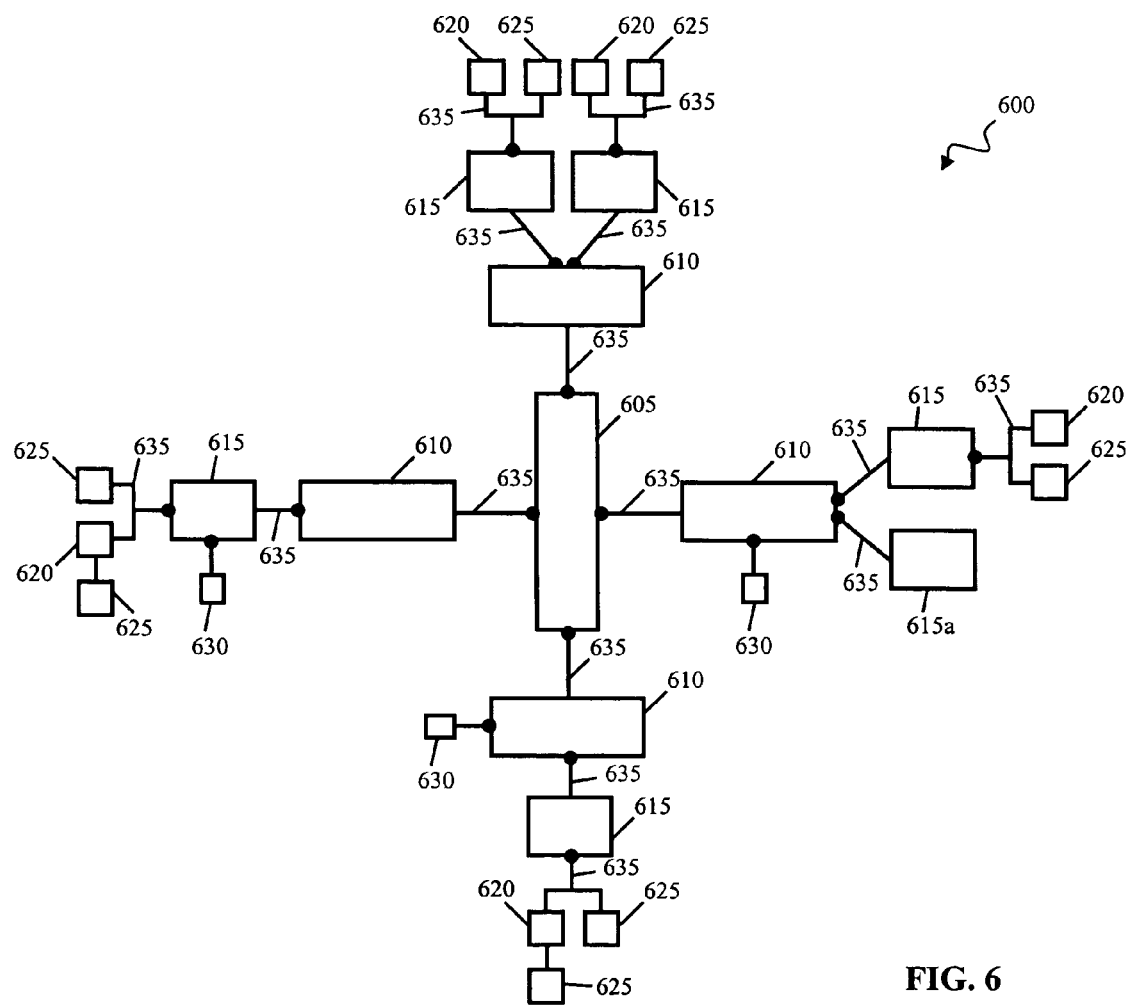

FIG. 6 is a schematic representation of another example reporting data model that can be used to store data at reporting model data store 120 (FIG. 1), namely a warehouse schema 600. Warehouse schema 600 includes a set of relational tables. In particular, warehouse schema 600 includes a fact table 605, a collection of dimension tables 610, a collection of surrogate identification tables 615, a collection of master data tables 620, a collection of text tables 625, and a collection of join paths 635.

Fact table 605 is a collection of measure objects that include measures. The measures in fact table 605 can be keys in dimension tables 610. Dimension tables 610 are collections of one or more dimension objects that organize characteristics that describe the measures in fact table 605. The characteristics in dimension tables 610 can be numeric.

Surrogate identification tables 615 are collections of one or more dimension objects that organize mapping information. In particular, surrogate identification tables 615 include information for mapping characteristics in dimension tables 610 to objects and/or to characteristics in other tables. Surrogate identification tables 615 generally appear in multiple warehouse schemata.

The mapping information in individual surrogate identification tables 615 can relate to classes of objects with common features. For example, "time independent" surrogate identification tables 615 can map characteristics in dimension tables 610 to objects that include attributes to which time information is relatively unimportant. For example, an employee object that includes the name, gender, date of birth, and social security number of an employee can be considered an object having attributes to which time information is relatively unimportant. In particular, these attributes are unlikely to change and the time of any such a change is not typically relevant to the data processing activities. Since time information is relatively unimportant to these attributes, such time independent surrogate identification tables 615 need not include time information.

"Time dependent" surrogate identification tables 615 are another example of a class of surrogate identification table 615. Time dependent surrogate identification tables 615 can map characteristics in dimension tables 610 to objects that include attributes to which time information is relevant to data processing activities. For example, an employee object that includes the position and department attributes of an employee in a company can be considered an object having attributes to which time information is potentially relevant. In particular, the chronological history of an employee's position and department assignments may be relevant to data processing activities in the company. Since time information is potentially relevant to these attributes, time independent surrogate identification tables 615 can include time information. In the employee object example discussed above, this time information could include time stamps that describe "valid from" and "valid to" dates for the mapped position and department attributes of the employee.

Another class of surrogate identification table 615 can map dimension table characteristics exclusively to characteristics in that individual surrogate identification table. FIG. 6 shows an example of such a table, namely surrogate identification table 615a. Since surrogate identification table 615a maps dimension table characteristics exclusively to characteristics in that surrogate identification table 615, there are no join paths 635 that originate from surrogate identification table 615a.

Object tables 620 are collections of objects in the data processing system. The objects can be relevant to multiple processes and/or areas in an enterprise such as a business. For example, objects can describe characteristics of products, employees, customers, or other entities that are relevant to multiple portions of an enterprise. The objects in tables 620 can be dependent attributes of dimension record data in dimension tables 610. Object tables 620 generally appear in multiple warehouse schemata.

Text tables 625 are collections of textual descriptions of characteristics. The characteristics described by text tables can be found in, e.g., surrogate identification tables 615 or object tables 620. The textural descriptions provided by text tables 625 are typically natural language descriptions. For example, text tables 625 can provide natural language descriptions of dimension record data in different languages. Text tables 625 generally appear in multiple warehouse schemata.

Hierarchy tables 630 are special purpose collections of information derived from a master hierarchy. A hierarchy is a representation of the organization of common values of a characteristic in a tree structure. Hierarchy tables 630 can be created from a master hierarchy by selecting common values of a characteristic that stand in a particular parent-child relationship in the tree structure. Hierarchy tables 630 can thus be limited to a single column that describes the common values of a characteristic that stand in the particular parent-child relationship. The special purposes for which hierarchy tables 630 can be created include searching for measures that are relevant to characteristics that stand in the particular parent-child relationship.

Join paths 635 indicate relationships between the measures in fact table 605, the characteristics in dimension tables 610, the mapping information in surrogate identification tables 615, the objects in object tables 620, the text in text tables 625, and the hierarchical information in hierarchy tables 630.

Figure 7:
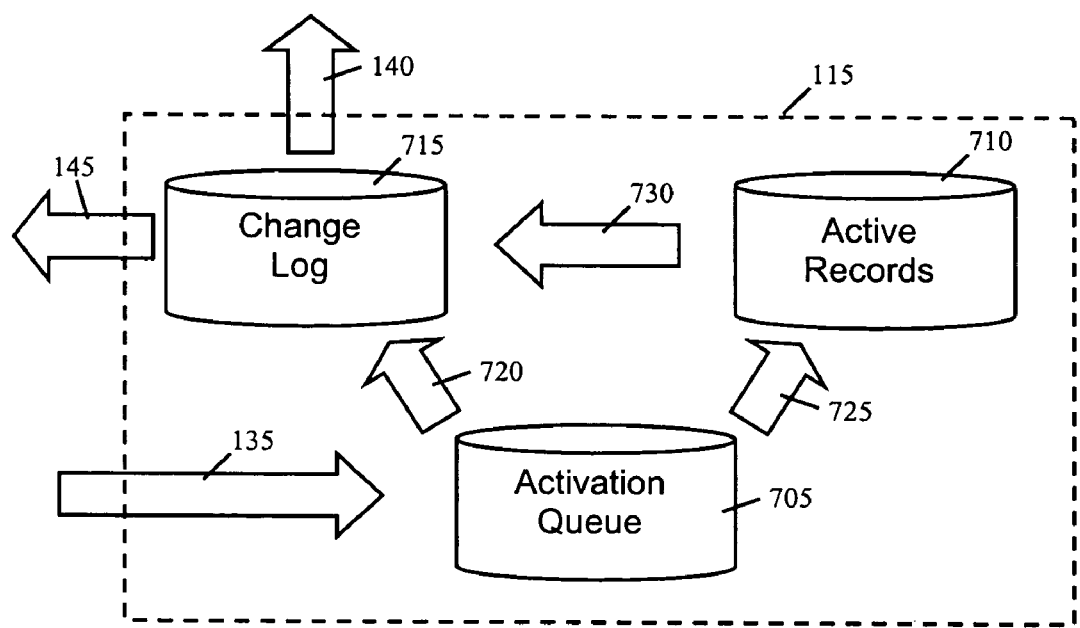
FIG. 7 is a schematic representation of an example reporting model delta data store.

FIG. 7 is a schematic representation of an example reporting model delta data store 115 (FIG. 1). Reporting model delta data store 115 includes an activation queue store 705, an active record store 710, and a change log store 715 that can communicate with each other over data flow paths 720, 725, 730 to receive and transmit data along data flow paths 135, 140, 145 and allow reporting model delta data store 115 to be integrated into hybrid data provider 160.

In particular, activation queue store 705 is an ordered collection of activation information that is stored at one or more data storage devices. Activation information characterizes changes made to one or more transactional models in transactional data model store 110. Activation information can be received from transactional data model store 110 over data flow path 135. The activation information in activation queue store 705 is ordered as a queue that represents the order in which the changes to the one or more transactional models were made. Activation queue store 705 can be, e.g., a linked list, a data table, or other data storage structure that can accommodate a variable rate of changes to one or more transactional models but yet maintain ordering.

Active record store 710 is a collection of information that is stored at one or more data storage devices. Active record store 710 can be a "complete" record of the contents of transaction model data store 110 in that active record store 710 contains all the information that has been dequeued from activation queue 705 regarding the contents of one or more transaction models in transaction model data store 110. Thus, information that has yet to be conveyed over data flow path 135 is not contained in active record store 710 (see, e.g., line 220, FIG. 3). The information stored in active record store 710 is generally not stored in a reporting model but rather can be stored, e.g., in a single database table.

Change log store 715 is a collection of information that sets forth pending changes to one or more reporting models in reporting model data store 120. The changes are pending in that they have not yet been committed to reporting model data store 120 but rather are accumulating in changed log 715. The pending changes can be stored in a format that is tailored to facilitate the transfer of information to reporting model data store 120 and to facilitate the aggregation of result sets from hybrid data provider 160. For example, the pending changes can be stored in a format that can be written directly into reporting model data store 120, such as a 1:1 transformation to convey the contents of change log store 715 to reporting model data store 120. Further, in some implementations, the editing of this transformation by a user can be foreclosed.

The pending changes can be stored in data assemblies that associate additive deltas with identifiers of the records in reporting model data store 115 that are to be changed (hereinafter "additive delta records"). An additive delta is a numeric value that, when added to a numeric measure in a reporting model, changes that measure to make it more current. However, an additive delta need not overwrite the old measure to make the reporting model more current. Rather, an additive delta, along with other information specifying the record that is to be changed, can be committed to a reporting model and stored in the reporting model alongside the prior measure.

FIGS. 8, 9, 10A, 10B illustrate example additive delta records and their correspondence to the contents of a reporting or other data model stores. In particular, FIG. 8 is a table 800 that schematically represents a portion of the prior contents of a reporting model or other data store. For example, table 800 can be part of reporting model data store 120 (FIG. 1) or table 800 can be part of active record store 710.

Table 800 includes a collection of columns 805, 810, 815, 820, 825, 830 that associate their contents into a series of records 835, 840, 845, 850. Column 805 includes a collection of document numbers. The document numbers can each identify, e.g., a relevant sales order. For example, the document numbers of records 835, 840 both identifier the same sales order "100001." Column 810 includes a collection of document item identifiers. The document item identifiers can identify, e.g., an item purchased in the identified sales orders. Column 820 includes a collection of order quantity identifiers. The order quantity measures can characterize, e.g., the quantity of items purchased in the identified sales orders. Column 825 includes a collection of unit of measure identifiers. The unit of measure identifiers can identify, e.g., the units of measure of the quantities of items purchased in the identified sales orders. Additional columns 815, 830 can include additional information regarding the identified sales orders.

In setting forth part of the prior contents of a reporting or other data model store, records 835, 840, 845, 850 can, for example, set forth the same values that they set forth when table 800 was initialized. As another example, records 835, 840, 845, 850 can set forth the same values at they set forth when table 800 was last updated.

FIG. 9 is a table 900 that schematically represents a portion of the subsequent contents of a reporting model or other data store. For example, table 900 can be part of reporting model data store 120 (FIG. 1) after an update. Table 900 can also be part of active record store 710 after an update or part of activation queue store 705.

Table 900 includes a collection of columns 905, 910, 915, 920, 925, 930 that associate their contents into a series of records 935, 940, 945. Column 905 includes a collection of document numbers. Column 910 includes a collection of document item identifiers. Column 920 includes a collection of order quantity measures. Column 925 includes a collection of unit of measure identifiers. Additional columns 915, 930 can include additional information regarding the identified sales orders.

In setting forth part of the subsequent contents of a reporting or other data model store, records 935, 940, 945 can set forth more current values in a data processing system. For example, records 935, 940, 945 can set forth more current values that were propagated into table 900 during an update. In particular, record 935 indicates that the quantity of items "10" ordered in sales order document number "100001" decreased by 10%, i.e., to 180 pieces, from the prior value of 200 pieces set forth in record 835 of table 800 (FIG. 8). Record 935 indicates that the quantity of items "20" ordered in sales order document number "100001" increased by 10%, i.e., to 165 pieces, from the prior value of 150 pieces set forth in record 840 of table 800 (FIG. 8).

FIG. 10A is a table 1000 that schematically represents example additive delta records. The additive delta records can be uploaded into a reporting model or other data store to change reporting from the reporting model or other data store without an update and can reside in the reporting model or other data store until an update. For example, table 1000 can be part of change log 715 before uploading or part of reporting model data store 120 after uploading.

Table 1000 includes a collection of columns 1005, 1010, 1015, 1020, 1025, 1030 that associate their contents into a series of records 1035, 1040, 1045. Column 1005 includes a collection of document numbers. Column 1010 includes a collection of document item identifiers. Column 1025 includes a collection of unit of measure identifiers. Additional columns 1015, 1030 can include additional information regarding the identified sales orders.

Column 1020 includes a collection of additive deltas of order quantity measures. In particular, the additive deltas of column 1020 are numeric values that describe the magnitude of a change to a prior numeric order quantity measure. In particular, the additive delta set forth in row 1035 indicates that the prior value of 200 pieces of item "10" in sales order document number "100001" set forth in record 835 of table 800 (FIG. 8) has been decreased by 20 pieces to accurately reflect a more current value. The additive delta set forth in row 1040 indicates that the prior value of 150 pieces of item "20" in sales order document number "100001" set forth in record 840 of table 800 (FIG. 8) has been increased by 15 pieces to accurately reflect a more current value. Please note that negative additive deltas (e.g., an additive delta of "−20") can be used to reduce the numeric value of a measure.

FIG. 10B is table 1050 that schematically represents other examples of additive delta records. Table 1050 can be part of change log 715 before uploading or part of reporting model data store 120 after uploading.

Table 1050 includes columns 1005, 1010, 1015, 1020, 1025, 1030 that associate their contents into a series of records 1055, 1060, 1065, 1070. In table 1050, multiple records are used to describe additive deltas of a single order quantity measure. For example, row 1055 indicates that the prior value of 200 pieces of item "10" in sales order document number "100001" set forth in record 835 of table 800 (FIG. 8) has been decreased by 200 pieces and row 1060 indicates that the value of item "10" in sales order document number "100001" has been increased by 180 pieces. Together, rows 1055, 1060 describe additive deltas to accurately reflect a more current value of the single order quantity measure. As another example, row 1065 indicates that the prior value of 150 pieces of item "20" in sales order document number "100001" set forth in record 840 of table 800 (FIG. 8) has been decreased by 150 pieces and row 1070 indicates that the value of item "20" in sales order document number "100001" has been increased by 165 pieces. Together, rows 1065, 1070 describe additive deltas to accurately reflect a more current value of the single order quantity measure.

Returning to FIG. 7, in operation, data flow paths 720, 725, 730 in reporting model delta data store 115 can convey data to allow reporting model delta data store 115 to be integrated into hybrid data provider 160.

In particular, at some time To after initiation, data flow path 135 conveys information describing changes to data storage in one or more transactional data models in transactional model data store 110. The information conveyed along data flow path 135 is received and enqueued at activation queue 705. As the received information is dequeued, data flow paths 720, 725, 730 can be used to convey that information to change log 715 and active records 710. As information is dequeued, it is expunged from activation queue 705.

The conveyance of information along data flow paths 720, 725, 730 can depend upon the nature of the changes that are to be made. For example, information describing an insert that is to create a new record in both change log 715 and active records 710 can be conveyed directly from activation queue 705 to change log 715 along data flow path 720 and from activation queue 705 to active records 710 along data flow path 725.

As another example, information describing a deletion that is to remove an existing record in active records 710 can be conveyed to from activation queue 705 to active records 710 along data flow path 725. The existing record that is to be removed can be selected from active records 710. The key figures in the selected record can then be inverted and the inverted record can be conveyed from active records 710 to change log 715 along data flow path 730.

As yet another example, information describing an update that is to change one or more key figures in an existing record in active records 710 can be conveyed to from activation queue 705 to active records 710 along data flow path 725. The existing record that is to be changed can be selected from active records 710. The key figures in the selected record can then be inverted and the inverted record can be conveyed from active records 710 to change log 715 along data flow path 730. The existing record can also be updated in active records 710, and the updated record conveyed from active records 710 to change log 715 along data flow path 730. Thus, the conveyance of multiple records from active records 710 to change log 715 can be used to describe additive deltas of even a single measure, much like rows 1055, 1060 (FIG. 10B).

In response to receiving information along data flow path 725, active records data store 710 can incorporate the received information into a data structure that has been updated to more accurately reflect the current state of information in system 100. One example of a portion of such an active records data store 710 is table 900 (FIG. 9). Active records data store 710 can thus include the complete information content of both reporting model data store 120 and change log 715.

Figure 11:
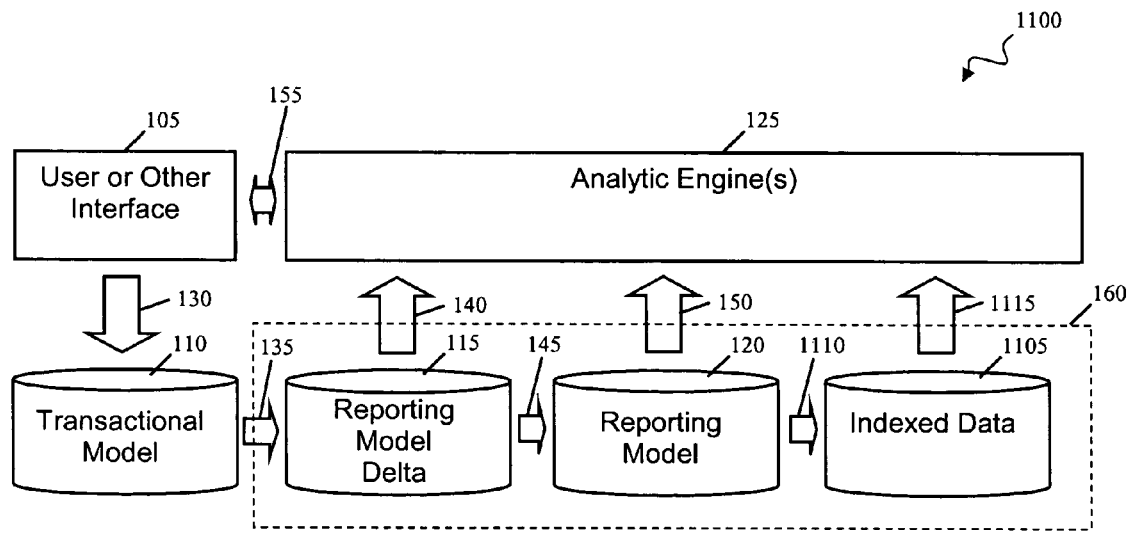
FIG. 11 is a schematic representation of a system that includes another hybrid data provider.

In response to receiving information along data flow path 720, change log 715 can incorporate the received information into additive delta records that associate additive deltas with identifiers of the records in reporting model data store 115 that are no longer current. The records can be accumulated in a data structure, such as data table 1000 (FIG. 10). Such data structures thus characterize the reporting model delta and can be accessed by analytic engine 125 along data flow path 140 to provide an aggregated result set even before the reporting model deltas are committed to reporting model 120 along data flow path 145. Once reporting model deltas are committed to reporting model 120, they can be expunged from change log 715. Change log 715 is thus not complete in that it does not contain all the information that has been dequeued from activation queue 705 regarding the contents of one or more transaction models in transaction model data store 110. Rather, change log 715 only contains pending additive delta records that have yet to be committed to reporting model 120. Thus, a level marker than denotes which changes have been committed from change log 715 to reporting model 120 is unnecessary FIG. 11 is a schematic representation of another system 1100 that includes a hybrid data provider. In addition to interface 105, transactional model data store 110, reporting model delta data store 115, reporting model data store 120, and analytic engine 125, system 1100 also includes an indexed data store 1105.

Indexed data store 1105 is a collection of information that is stored at one or more data storage devices. Indexed data store 1105 can store this information in one or more documents, data structures, data models, or other data storage devices (hereinafter "documents") that are indexed to an inverted index and searchable through the index. Indexed data store 1105 can thus be searched, e.g., using fuzzy text searching, Boolean searching, attribute searching, linguistic searching, advanced text mining searches, and the like. For example, indexed model data store 1105 can be searched using the Text Retrieval and Information Extraction service (TREX) component of SAP Netweaver (SAP AG, Walldorf, Germany).

In operation, indexed data store 1105 can receive and incorporate more current information along a data flow path 1110 from reporting model data store 120 as shown, or indexed data store 1105 can receive and incorporate more current information along data flow paths from other sources, such as, e.g., directly from transactional model data store 110 (FIG. 1). This information, along with other information stored at indexed data store 1105, can be used to respond to queries and other searches by analytic engine 125 jointly with reporting model delta data store 115 and reporting model data store 120, as represented by data flow path 1115. Thus, reporting model delta data store 115, reporting model data store 120, and indexed data store 1105 can act as hybrid data provider 160 and allow analytic engine 125 to aggregate result sets across all three data stores.

Figure 12:
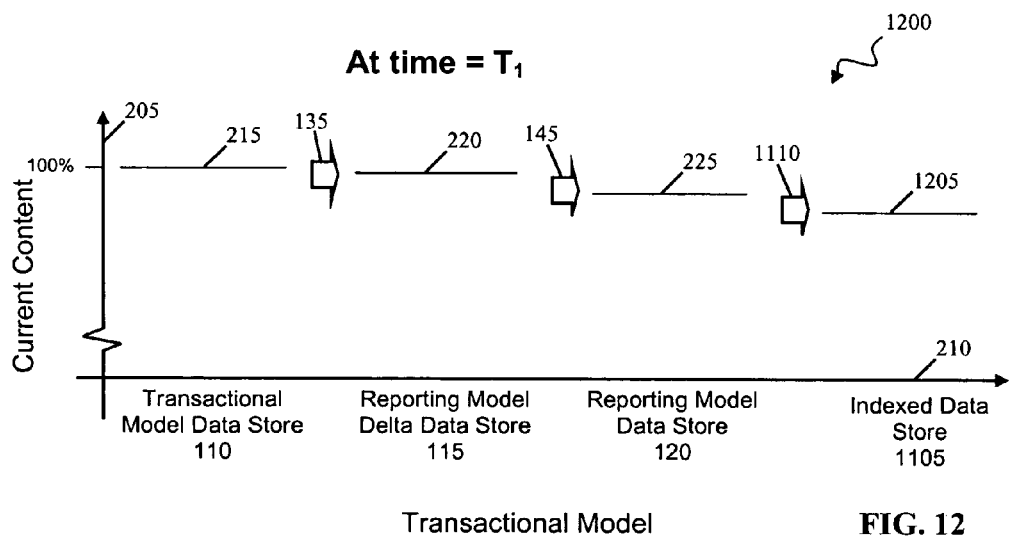
FIG. 12 is a graph that schematically represents how current the data content of data stores in the system of FIG. 11 are at a time $T_1$.

In one implementation, namely, when indexed data store 1105 receives and incorporates more current information along data flow path 1110 from reporting model data store 120, the data content of indexed data store 1105 is generally less current than the data content of transactional model data store 110, reporting model delta data store 115, and reporting model data store 120. This is represented in FIG. 12, which is a graph 1200 that schematically represents how current the data content of transactional model data store 110, reporting model delta data store 115, reporting model data store 120, and indexed data store 1105 are at a time $T_1$.

As can be seen, the vertical position of a line 1205 is lower than the vertical position of lines 215, 220, 225, denoting that even less of the data in indexed data store 1105 is current than the data in reporting model data store 120, the data in reporting model delta data store 115, and the data in transactional model data store 110. However, with analytic engine 125 providing aggregated result sets drawn from all of reporting model delta data store 115, reporting model data store 120, and indexed data store 1105, the benefits of quick data access in indexed data store 1105 and reporting model data store 120 for the majority of the data can be combined with the benefit of early access to more current data in reporting model delta data store 115. In particular, even recent transactions will appear in result sets generated by analytic engine 125 with a minor additional cost associated with the access and retrieval of data from reporting model delta data store 115.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made. For example, process steps can be performed in different order, and steps can be omitted, and meaningful results nevertheless achieved. As another example, system elements can be arranged in different order or omitted and meaningful results nevertheless achieved. As yet another example, in some implementations, data flow paths 725, 730 can be used to convey dequeued information to both change log 715 and active records 710 and data flow path 720 can be omitted. Accordingly, other implementations are within the scope of the following claims.

What is claimed is:

1. A system including at least one processor and at least one memory, the system comprising:
   a hybrid data provider comprising:
   a reporting model data store comprising a first collection of information stored in accordance with a reporting data model;
   a reporting model delta data store comprising a second collection of information setting forth a collection of one or more additive delta records, the additive delta records each including a numeric value that characterizes the magnitude of a change to a numeric measure in the first collection, wherein the numeric measure is no longer current, and identification information that identifies the numeric measure in the first collection;
   an analytic engine to perform queries on the hybrid data provider to yield an aggregated result from the first collection of information in the reporting model data store and the second collection of information that is based on the contents of both the first collection of information and the second collection of information; and
   a transactional data model store comprising a third collection of information stored in accordance with a transactional data model and a data flow path to convey transactional changes made to the third collection of information to the second collection of information; wherein the data flow path comprises an activation queue to receive the transactional changes made to the third collection of information and convey information describing the transactional changes to the second collection of information.

2. The system of claim 1, wherein the reporting model comprises a set of relational tables.

3. The system of claim 2, wherein the set of relational tables comprises a common warehouse metamodel.

4. The system of claim 1, wherein the system further comprises a data flow path to upload the second collection of information into the first collection of information.

5. The system of claim 4, wherein the first collection of information comprises previously uploaded additive delta records.

6. The system of claim 4, wherein all of the additive delta records are pending and have not been uploaded into the first collection of information.

7. The system of claim 1, further comprising an indexed data store that is accessible to the analytic engine for the generation of aggregated result sets that include information from the indexed data store.

8. The system of claim 7, further comprising a data flow path from the first collection of information to the indexed data store.

9. The system of claim 1, wherein the data flow path comprises an active record store that stores complete information received from the third collection of information.

10. An article comprising one or more tangibly-embodied machine-readable media storing instructions operable to cause one or more computer systems having at least one processor and memory to perform operations comprising:

querying a hybrid data provider to obtain results from a first collection of information stored in accordance with a reporting data model in a reporting model data store within the hybrid data provider and to obtain results from a second collection of information in a reporting model delta data store within the hybrid data provider setting forth a collection of one or more additive delta records, the additive delta records each including a numeric value that can be added to a measure in the first collection of information, and identification information that identifies the measure in the first collection of information;

an analytic engine to perform queries on the hybrid data provider to yield an aggregated result from the first collection of information in the reporting model data store and the second collection of information that is based on the contents of both the first collection of information and the second collection of information;

a transactional data model store comprising a third collection of information stored in accordance with a transactional data model and a data flow path to convey transactional changes made to the third collection of information to the second collection of information; wherein the data flow path comprises an activation queue to receive the transactional changes made to the third collection of information and convey information describing the transactional changes to the second collection of information; and generating an aggregated result set that reflects both the contents of the results obtained from the first collection of information and the second collection of information.

11. The article of claim 10, wherein querying the first collection of information comprises querying a set of relational tables.

12. The article of claim 10, wherein querying the second collection of information comprises querying a data table that associates the numeric value and the identification information of each additive delta in a row.

13. The article of claim 10, wherein providing the aggregated result set comprises summing a first numeric value of a first additive delta with a first measure in the first collection of information, wherein the identification information of the first additive delta is identical to information associated with the first measure in the first collection of information.

14. The article of claim 10, wherein:

the operations further comprise searching an indexed data store; and the aggregated result set reflects contents of the first collection of information, contents of the second collection of information, and contents of the indexed data store.

15. The article of claim 12, wherein the operations further comprise uploading the second collection of information into the first collection of information.

16. A system including at least one processor and at least one memory, the system comprising:

a hybrid data provider comprising a first data store and a second data store, the first data store containing a collection of data objects that are modified in response to transactional changes, the second data store containing a collection of relational data tables that reflect less than all of the transactional changes to content of the data object collection, the first data store being coupled to the second data store via a data flow path to convey unreflected changes to the data object collection to the relational data table collection, wherein the data flow path includes a staging data storage area that accumulates pending changes to be made to the relational data table collection;

an analytic engine to perform queries on both the staging data storage area and the collection of relational data tables to generate an aggregated result set that reflects the contents of both the staging data storage area and the collection of relational data tables; and a transactional data model store comprising a third collection of information stored in accordance with a transactional data model and a data flow path to convey transactional changes made to the third collection of information to the second collection of information; wherein the data flow path comprises an activation queue to receive the transactional changes made to the third collection of information and convey information describing the transactional changes to the second collection of information.

17. The system of claim 16, wherein the pending changes comprise additive delta records, the additive delta records each including a numeric value that characterizes the change to a numeric measure in the collection of relational data tables, wherein the numeric measure is no longer current, and identification information that identifies the numeric measure in the collection of relational data tables.

18. The system of claim 16, wherein the system further comprises an indexed data store that is accessible to the analytic engine for the generation of aggregated result sets that include information from the indexed data store.

* * * * *